(12) United States Patent
Caliga

(10) Patent No.: US 11,549,811 B2
(45) Date of Patent: Jan. 10, 2023

(54) ATOM CHIP FOR ULTRACOLD ATOM PREPARATION AND LOADING INTO AN INTEGRATED OPTICAL WAVEGUIDE EVANESCENT FIELD TRIP

(71) Applicant: SRI International, Menlo Park, CA (US)

(72) Inventor: Seth Charles Caliga, Princeton, NJ (US)

(73) Assignee: SRI International, Menlo Park, CA (US)

( * ) Notice: Subject to any disclaimer, the term of this patent is extended or adjusted under 35 U.S.C. 154(b) by 206 days.

(21) Appl. No.: 17/251,101

(22) PCT Filed: Jun. 13, 2019

(86) PCT No.: PCT/US2019/037031
§ 371 (c)(1),
(2) Date: Dec. 10, 2020

(87) PCT Pub. No.: WO2019/241544
PCT Pub. Date: Dec. 19, 2019

(65) Prior Publication Data
US 2021/0190496 A1    Jun. 24, 2021

Related U.S. Application Data

(60) Provisional application No. 62/685,631, filed on Jun. 15, 2018.

(51) Int. Cl.
G01C 19/62    (2006.01)
G01C 19/72    (2006.01)
G01P 15/08    (2006.01)

(52) U.S. Cl.
CPC .......... *G01C 19/62* (2013.01); *G01C 19/721* (2013.01); *G01P 15/0802* (2013.01)

(58) Field of Classification Search
CPC ... G01C 19/62; G01C 19/721; G01P 15/0802; G01P 15/08
See application file for complete search history.

(56) References Cited

U.S. PATENT DOCUMENTS 3,761,721 A    9/1973  Altshuler et al.
7,030,370 B1 *  4/2006  Crookston ............... H05H 3/04
                                                250/251

(Continued)

OTHER PUBLICATIONS

International Search Report and Written Opinion, PCT/US2019/037031, ISA:US, dated Sep. 10, 2019, 15 pp.

(Continued)

*Primary Examiner* — Jonathan M Hansen
(74) *Attorney, Agent, or Firm* — Rutan and Tucker, LLP

(57) ABSTRACT

An embodiment of an integrated atom chip used for measuring atoms is discussed. One or more magnetic traps integrated with an optical waveguide that is imprinted onto the integrated atom chip facilitate loading of the atoms into an evanescent field optical trap of the optical waveguide in order to measure the atoms. The two or more stages of cooling are used to progressively cool the atoms from an initial temperature down to a final temperature of the atoms when mode matched and loaded into the evanescent field optical trap of the optical waveguide.

20 Claims, 7 Drawing Sheets

(56) References Cited

U.S. PATENT DOCUMENTS

| | | |
|---|---|---|
| 9,030,655 B2 | 5/2015 | Strabley et al. |
| 2011/0223590 A1* | 9/2011 | Chiou ................. C12Q 1/6869 |
| | | 436/164 |
| 2016/0377436 A1 | 12/2016 | Compton et al. |

OTHER PUBLICATIONS

Salim, Ultracold matter systems and atomtronics instrumentation, 2011, 176 pp.

\* cited by examiner

ATOM CHIP FOR ULTRACOLD ATOM PREPARATION AND LOADING INTO AN INTEGRATED OPTICAL WAVEGUIDE EVANESCENT FIELD TRIP

CROSS-REFERENCE

This application is a 35 U.S.C. § 371 U.S. National Stage of International Patent Application No. PCT/US2019/037031, titled "ATOM CHIP FOR ULTRACOLD ATOM PREPARATION AND LOADING INTO AN INTEGRATED OPTICAL WAVEGUIDE EVANESCENT FIELD TRAP" having an International Filing Date of Jun. 15, 2019, which claims the benefit of and priority under 35 USC 119 to U.S. provisional patent application Ser. 62/685,631, titled "Atom chip for ultracold atom preparation and loading into an integrated optical waveguide evanescent field trap," filed 15 Jun. 2018, which is incorporated herein by reference in its entirety.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

TECHNICAL FIELD

Embodiments generally relate to a system to trap, cool, and load neutral atoms in a mode matched fashion. More particularly, an aspect of an embodiment relates to a system that integrates magnetic traps and an optical waveguide in an integrated atom chip to efficiently load ultracold atoms into a high quality optical waveguide trap.

BACKGROUND

Standard practice could use a magneto-optical trap (MOT) located near an optical waveguide, but there are fundamental limits to the nearest approach of a MOT to the waveguide. Additionally, prior approaches resulted in insufficient optical power capacity within the waveguide due to poor thermal dissipation and waveguide defects.

SUMMARY

Provided herein can be various methods, apparatuses, and systems for atom trapping. In an embodiment, an integrated atom chip measures atoms. One or more magnetic traps integrated with an optical waveguide that is imprinted onto the integrated atom chip facilitate loading of atoms into an evanescent field optical trap of an optical waveguide in order to measure the atoms. Two or more stages of cooling progressively cool the atoms from an initial temperature down to a final temperature of the atoms when mode matched and loaded into the evanescent field optical trap of the optical waveguide.

These and many other features are discussed.

DRAWINGS

Figure 1A:
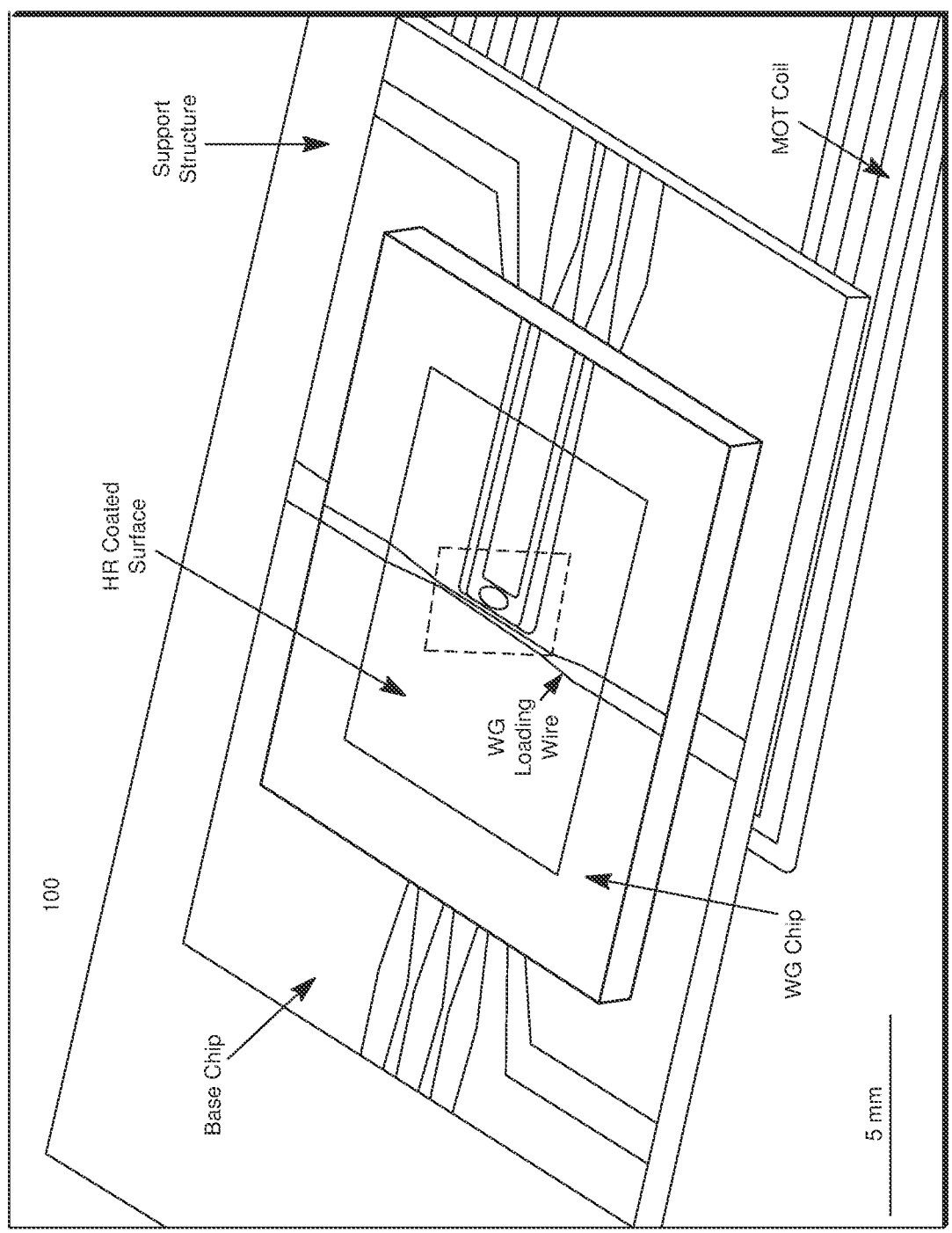
FIG. 1A illustrates a diagram of an embodiment of an example integrated atom chip that integrates two or more magnetic traps and an optical waveguide imprinted onto the integrated atom chip for measuring atoms.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of wires, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first wire, can be made. However, the specific numeric reference should not be interpreted as a literal sequential order but rather interpreted that the first wire is different than a second wire. Thus, the specific details set forth can be merely exemplary. The specific details can be varied from and still be contemplated to be within the spirit and scope of the present design. The term "coupled" is defined as meaning connected either directly to the component or indirectly to the component through another component.

FIGS. 1A-2 illustrate an embodiment of portions of an example integrated atom chip for measuring atoms that integrates one or more magnetic traps and an optical waveguide imprinted onto the integrated atom chip. The integrated atom chip integrates the magnetic and optical components on, for example, two separate chips for measuring atoms. The example magnetic traps cooperate with an optical waveguide to achieve direct atom trapping in the evanescent field of the waveguide on a same integrated chip. Past efforts at best utilized external trapping fields to localize atoms near the surface of an optical waveguide but not trapped directly by the evanescent field of the waveguide.

The example integrated atom chip integrates two or more magnetic traps and an optical waveguide imprinted onto the integrated atom chip to facilitate an efficient atom loading of atoms into the evanescent field optical trap (EFOT) of the optical waveguide for measuring atoms.

FIG. 1A illustrates a diagram of an embodiment of an example integrated atom chip 100 that integrates one or more magnetic traps and an optical waveguide imprinted onto the integrated atom chip 100 for measuring atoms. Structurally, the integrated atom chip 100 integrates the magnetic and optical components on two separate layers, such as different chips, for measuring atoms. The planar chip merges electrical current carrying wires and silicon nitride waveguides in a multilayer stackup.

To start with, a support structure may have the coils for a magneto-optical trap (MOT) to initially trap and laser cool the atoms. Next, a base layer on the support structure can be patterned with electrical current carrying metal traces, for example with gold or silver wires, for deep, tight magnetic trapping of the atoms. The gold or silver wires carry electrical currents and generate magnetic fields on the base chip. The base layer may also contain metal traces for a Radio Frequency (RF) atom cooling stage. Next, a top layer on a waveguide (WG) chip contains patterns for an optical waveguide in a co-planar structure to a magnetic trap used for magnetic loading of the atoms into the evanescent field optical trap of the optical waveguide. The top layer also has a high-reflectivity coated optical surface along with the patterns of the optical waveguide. The optical waveguide may be constructed with, for example, $Si_3N_4$ on $SiO_2$ on a base Si substrate. The top layer may also have an EFOT mode-matching wire. All of these magnetic traps and the optical waveguide all cooperate to load the atoms in a mode matched fashion. Thus, the integrated atom chip 100 integrates magnetic traps, a high-reflectivity coated optical surface, electrical current carrying metal traces, and patterns of the optical waveguide in a co-planar structure to trap, cool, and load neutral atoms in the mode matched fashion.

The multi-layer, integrated chip architecture can contain at least two stages of cooling that are used to cool the atoms from an initial temperature, such as ambient temperature, down to a final temperature, such as an ultracold temperature, of the atoms when loaded into the evanescent field optical trap of the optical waveguide.

Note, the ultracold atoms can be ensemble of atoms, such as 87 Rb atoms, at a temperature very close to 0 degrees Kelvin, such as $1\times10^{-7}$ of a degree Kelvin. This integrated atom chip 100 can capture atoms ranging in temperature $1\times10^{-3}$ to $1\times10^{-12}$ of a degree Kelvin.

A first stage of cooling may be laser cooling, such as in a mirror-magneto-optical trap (m-MOT). In the first stage of cooling, an initial atom trapping and cooling occurs in the loose magnetic trap of the MOT coils. Next, a second stage of trapping may use a pattern of electrical traces formed on one or more layers of the integrated atom chip 100 to create a magnetic trap, such as a Z-shaped wire trap. Each magnetic trap can use a magnetic field gradient to trap atoms with magnetic moments. The magnetic potential is formed by electrical current flowing through lithographically patterned metal traces, such as in the Z-shape, on the atom chip. Next, another stage of cooling may be a Radio Frequency (RF) based cooling stage for the atoms. In this stage of cooling, Radio Frequencies are used to cool atoms trapped within a magnetic field generated by a pattern of electrical traces formed on one or more layers of the integrated atom chip. In the RF cooling stage forced-RF evaporative atom cooling may occur for matter wave generation. The metal traces can carry an RF signal to eject hotter atoms from the trap, leaving the remaining magnetically trapped cooler atoms that will be loaded into the evanescent field optical trap of the optical waveguide. Other example RF cooling stages may use an external RF horn or other external RF coil. The RF cooling can supplement the patterned electrical traces on the chip for the magnetic trap and/or replace that cooling stage. Finally, a trap mode matching occurs for the efficient loading of the ultracold atoms into the evanescent field optical trap of the optical waveguide.

The entire integrated chip structure is housed in an ultrahigh vacuum system. Due to the integrated nature of the atom chip, the entire system is naturally conducive to operation in a small form factor. Thus, the loading the evanescent field optical trap via using the compressed magnetic trap with a designed set of atom-chip-traps (magnetic and optical), can lead to operation in the small form factor. In addition, the chip being fabricated on a semiconductor substrate with a thermal oxide layer can also contribute to a small form-factor. The design mainly needs a substrate that you can deposit or grow layers of dielectric with index contrast that can be patterned into waveguides. The cooled atoms trapped in the evanescent field optical trap of the waveguide may be measured for many different purposes.

An example multi-layer, integrated chip architecture for measuring atoms may be formed as follows. An example set of quadrupole, mm-scale, copper wires in a field coil may be used for the mirror-magneto-optical trap to form an initial magnetic trap on the support structure. A first patterned set of wires, may include a Z-shaped wire trap, but other patterns may be used on the base chip as well for magnetic trapping and Bose-Einstein condensate (BEC) formation. Also, one or more of the gold or silver μm-scale wires in the set of wires may carry an RF signal for additional cooling. A top layer chip may have a metal or dielectric high reflectivity (HR) coated surface, nanofabricated silicon nitride optical waveguides ($Si_3N_4$ on $SiO_2$ on Si), and additional electrical current carrying wires. An EFOT mode-matching wire on the waveguide (WG) chip can be used to match modes between the evanescent field optical trap and the final magnetic trap. In this example, the lines of each optical waveguide are imprinted on the WG chip coming in from the right side starting just left of the much larger gold lines of the wires on the base chip.

FIG. 1A shows the multi-layer, integrated chip architecture that integrates electrical current carrying wires in both a base layer and a top layer, with a top surface of the top layer having one or more waveguides, such as silicon nitride, all in a multilayer stackup.

The magnetic traps and optical waveguide integrated on the integrated atom chip 100 merge two techniques in the field of atomic physics to address outstanding limitations of atom traps and waveguides, namely to provide efficient loading of ultracold atoms into a high-quality optical waveguide trap.

An example atom chip design enables i) initial atom trapping and cooling in a mirror-magneto-optical trap, ii) further forced-RF evaporative atom cooling for matter wave generation, and iii) finally crucial trap mode matching for efficient atom loading into the evanescent field optical trap of an optical waveguide. This integrated atom chip 100 can provide a route to precision atomic sensing within highly dynamic reference frames, with a planar design that enables integration within man-portable and small-scale DoD platforms in sensors, such as accelerometers and gyroscopes. Furthermore, the EFOT provides strong atom-light coupling necessary for neutral atom quantum information processing. The design features are conducive to wafer level batch fabrication.

Figure 2A:
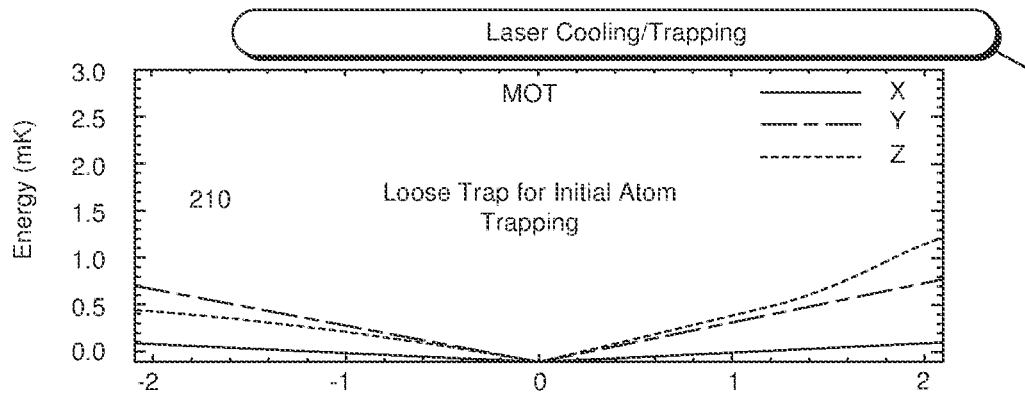
FIGS. 2A-2C illustrate graphs of an example trap progression during the fully-confined matter wave production, waveguide loading, and interferometry sequence in the integrated atom chip.
Figure 2B:
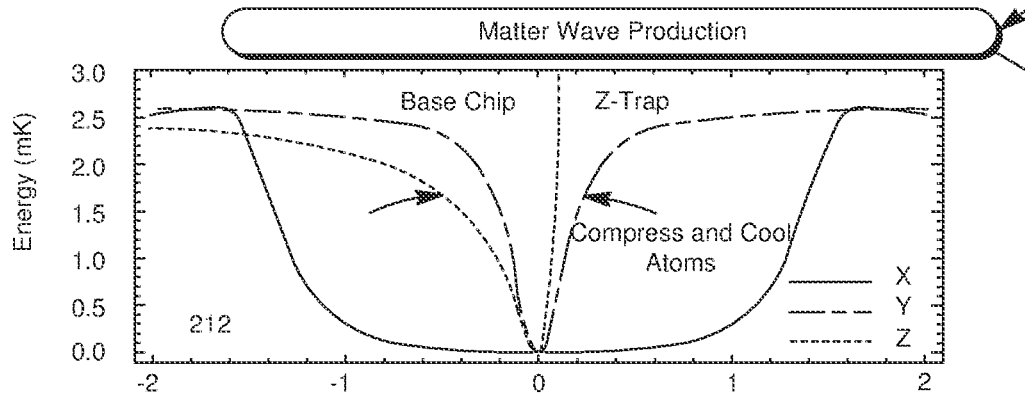
Figure 2C:
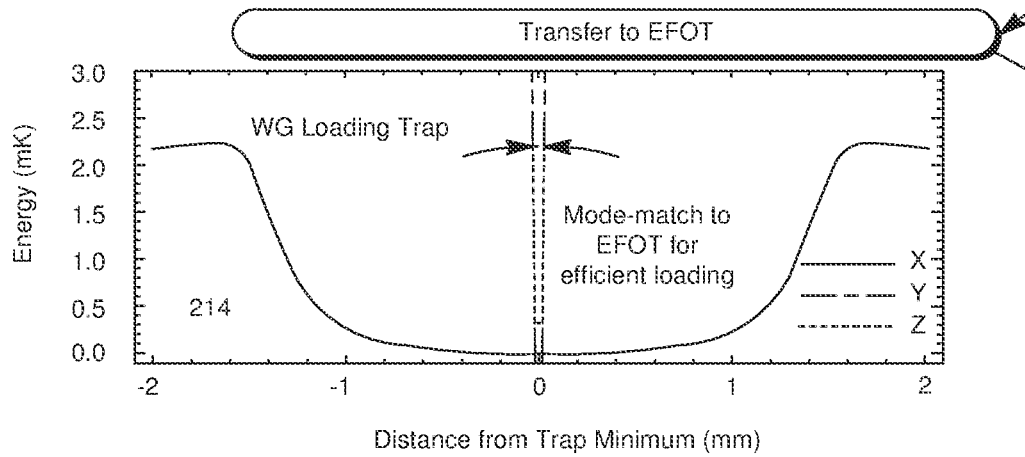
Figure 3:
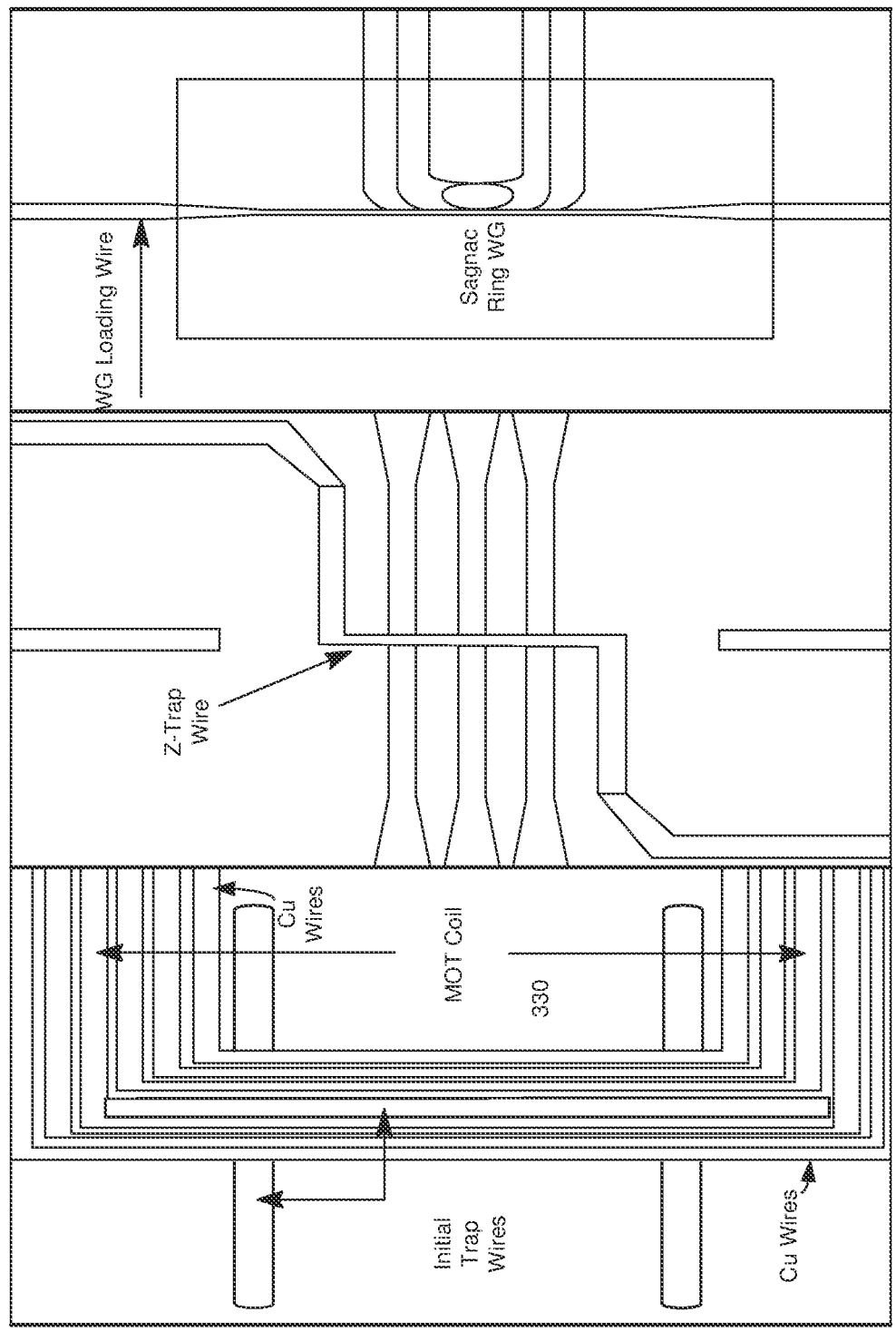
FIG. 3 illustrates a diagram of an embodiment of an example set of integrated magnetic trapping structures progressing left to right from a looser magnetic confinement to a tighter magnetic confinement on progressively cooler atoms being trapped.

An embodiment of the process shown in FIGS. 1A, 2, and 3 is essentially atoms are initially captured and cooled in a mirror-magneto-optical trap. These atoms are then optically pumped to a magnetically trappable state and captured in the magnetic potential formed by electrical current flowing through lithographically patterned metal traces on the atom chip, such as the Z-shaped wire trap. The atoms can be further cooled to form a Bose-Einstein condensate by forced-radio-frequency evaporation. The magnetic potential is then spatially compressed and shifted to overlap the evanescent field optical trap generated by a balance of red- and blue-detuned light propagating in the optical waveguide and match its trap volume and curvature. (See FIGS. 2 and 5) The atoms are then loaded into the evanescent field optical trap by extinguishing the magnetic potential and turning on the light within the waveguide.

Figure 1B:
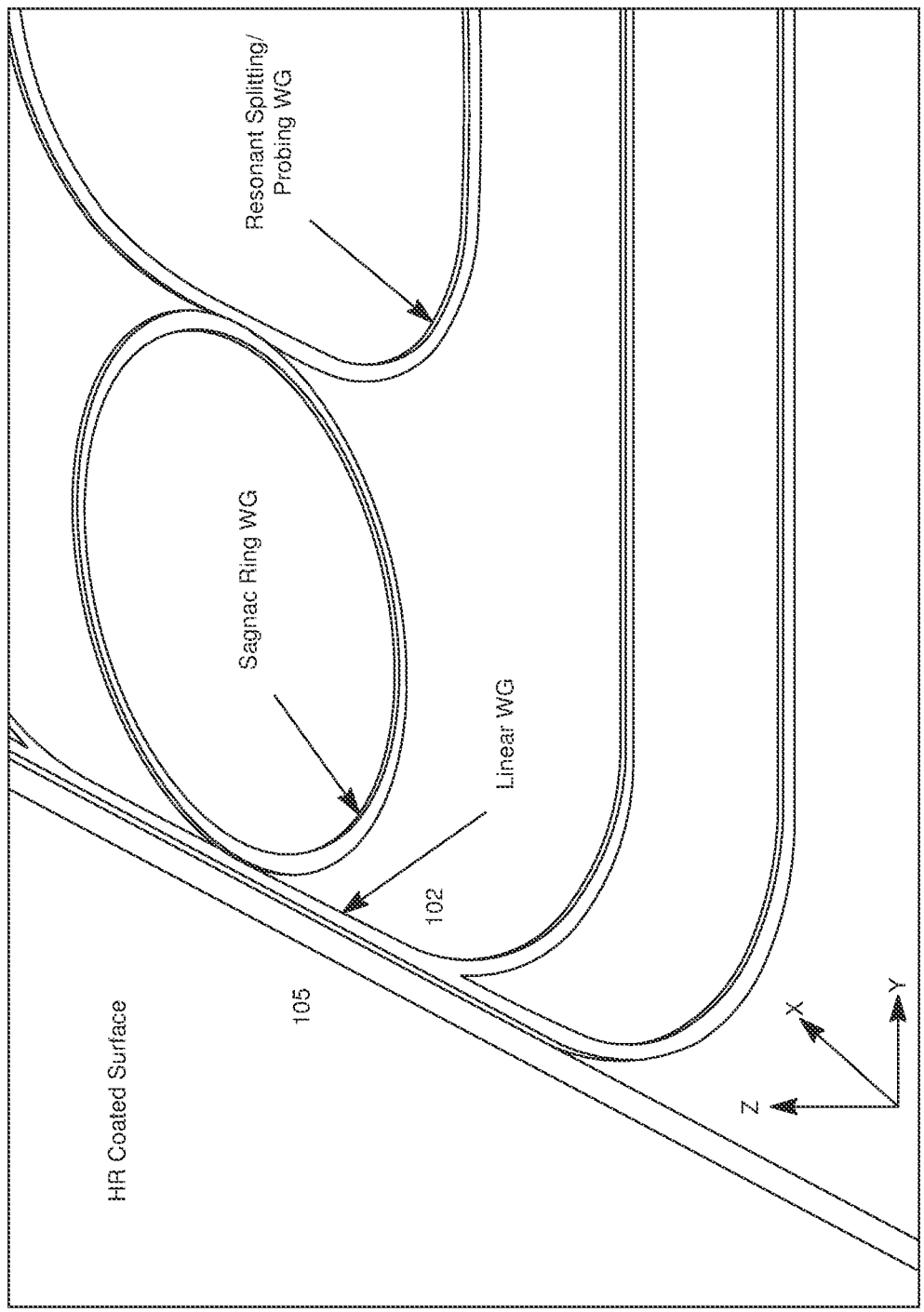
FIG. 1B illustrates an embodiment of example waveguide patterns imprinted onto a waveguide chip and an EFOT mode-matching wire.

FIG. 1B illustrates an embodiment of example waveguide patterns 102 imprinted onto a waveguide chip and an EFOT mode-matching wire. FIG. 1B illustrates a magnified view of the dashed square area shown on FIG. 1A, which shows the imprinted lines of the optical waveguide and the offset vertical gold line of the EFOT mode-matching wire 105 on the waveguide chip. The optical waveguide patterns shown in the WG lines imprinted on the top layer can be used for, for example, interferometry. The top WG chip contains the imprinted optical waveguide and EFOT mode-matching wire 105, as well as a high reflectivity coated surface.

Again, FIG. 1B illustrates an embodiment of example waveguide patterns 102 imprinted onto a waveguide chip. For example, there is an elliptical shaped pattern in the optical waveguide (e.g. a Sagnac ring), which can be used for a gyroscope. The linear pattern has long parallel path ways that join and/or split at a Y-shaped intersection, and can be used for sensors, such as accelerometers.

Figure 5:
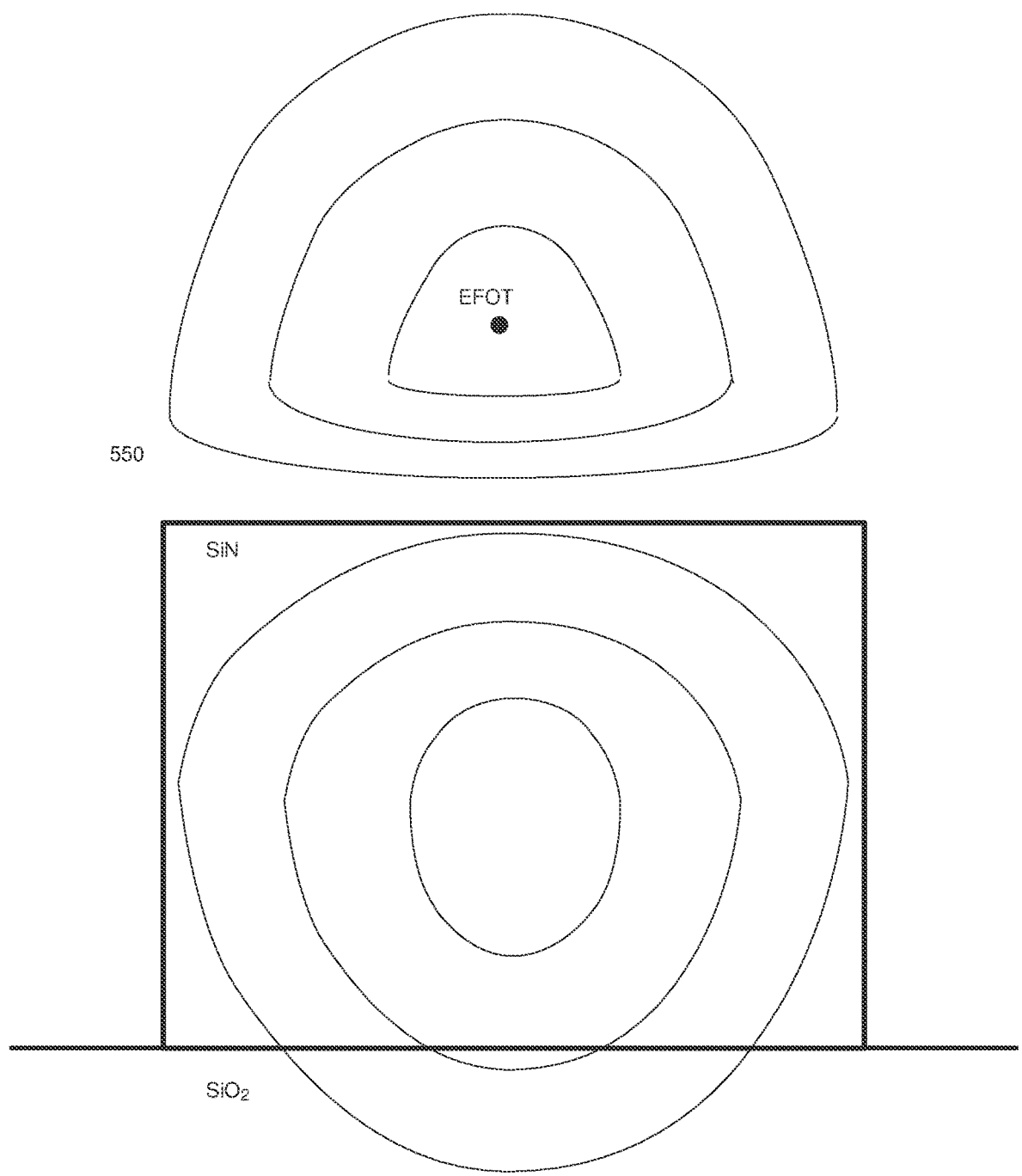
FIG. 5 illustrates a diagram of an embodiment of an EFOT potential evenly formed above the SiN waveguide, which is formed on the base $SiO_2$.

Note, low-loss ($\lesssim$dB/cm), high-quality optical waveguides can be fabricated as a silicon nitride rib on a silicon wafer with an intermediate layer of μm-thick thermally grown silicon dioxide ($SiO_2$) for proper waveguide index profile and minimized coupling to the underlying silicon (see FIG. 5).

Referring back to FIG. 16, in an embodiment, the cross-section dimensions of the optical waveguide are selected for single mode propagation of guided light at desired wavelengths. The wavelengths are selected to achieve balanced attractive and repulsive trapping forces on the atoms. The pattern of the waveguide can be tailored to the specific atom measurement.

The EFOT loading wire width should be similar to the distance between the EFOT loading wire and the EFOT optical waveguide. Thus, a magnetic trap has at least a first electrical trace configured to tightly magnetically trap the atoms and prepare the atoms to be loaded into the evanescent field optical trap of the optical waveguide by having a width of the first electrical trace for the final magnetic trap being similar in dimensions (i.e. close to a small in width) as a physical spacing between the optical waveguide imprinted on the integrated atom chip and the first electrical trace formed on the integrated atom chip. (e.g. see FIGS. 1B and 4)

The integrated magnetic and optical atom chip combines the benefits of magnetic atom chips and optical waveguides; solves optical waveguide atom loading issues; provides moderate ($\sim 10^5$) atom number for easy atom loading; tight high-quality traps to nearly eliminate orientation sensitivity; trap curvature $\gtrsim 10^3\times$ gravity; strong atom-light interface; moderate (cm) atomic matter wave packet separations; and a planar architecture.

Note, atom signal detection in a tight trap near the chip's surface can be achieved via use of the standard MOT recapture and in-situ high resolution fluorescence imaging schemes. The design can utilize strong coupling between atoms in the EFOT and guided optical modes of the optical waveguide to extract atomic signals from near-resonant light in the optical waveguide.

FIGS. 2A-2C illustrate graphs of an example trap progression during the fully-confined matter wave production, waveguide loading, and interferometry sequence in the integrated atom chip. FIG. 3 visually shows this progression as well. FIG. 3 illustrates a diagram of an embodiment of an example set of integrated magnetic trapping structures progressing left to right from a looser magnetic coupling to a tighter magnetic confinement on progressively cooler atoms being trapped.

The top graph (FIG. 2A) 210 shows the MOT trap is a very loose trap for the initial atom trapping. As discussed, initially, the laser cooling and trapping of the atoms occurs in the MOT 330. The atoms are captured and cooled in an example mirror-magneto-optical trap.

The middle graph (FIG. 2B) 212 shows the patterned metal-trace magnetic traps on the base layer. Atom trapping and cooling occurs. Atoms are trapped in a MOT 330. This process uses external laser beams and the MOT coil in the chip support structure. Atoms are then optically pumped to a magnetically trappable state and loaded into the magnetic trap formed by the Z-Shaped wire. Atoms in the Z-Wire trap are cooled by forced RF evaporation. Atoms are transferred from the Z-wire trap to the next magnetic trap formed by the EFOT loading wire. The EFOT loading trap is compressed and shifted to the location of the EFOT above the optical waveguide. Atoms are handed off from the magnetic EFOT loading trap, into the optical EFOT. Atoms in the EFOT can then be measured. Atom cooling occurs during the MOT stage 330 and the RF cooling stages.

The bottom graph (FIG. 2C) 214 shows the loading of atoms into the optical trap via the mode matching to the EFOT in order to efficiently load the atoms. The magnetic EFOT loading trap is spatially compressed and shifted to overlap the evanescent field optical trap (EFOT) generated by a balance of red- and blue-detuned light propagating in the optical waveguide and matches its trap volume and curvature. The atoms are then loaded into the evanescent field optical trap by extinguishing the magnetic potential and turning on the light within the waveguide. The chip's design can be altered to maximize evanescent field decay length to push the EFOT further from the surface of the waveguide.

Matter Wave—EFOT Loading

One crucial, yet ongoing challenge for the field of atom trapping in optical waveguide devices is the evanescent field optical trap loading process. The integrated atom chip approach achieves vastly improved mode matching by leveraging dynamically reconfigurable, non-dissipative magnetic potentials generated by the atom chip.

WG Loading Trap

Optimized trap geometry: efficient loading is achieved if the trap volumes of the initial and final traps are well mode matched and spatially overlapped. Here, the chip can quantify mode matching by β: $\beta = \overline{\omega_i}/\overline{\omega_f}$, the ratio of geometric mean trap frequencies, $$\overline{\omega} = \sqrt[3]{\omega_x \omega_y \omega_z} \ldots$$

Figure 6:
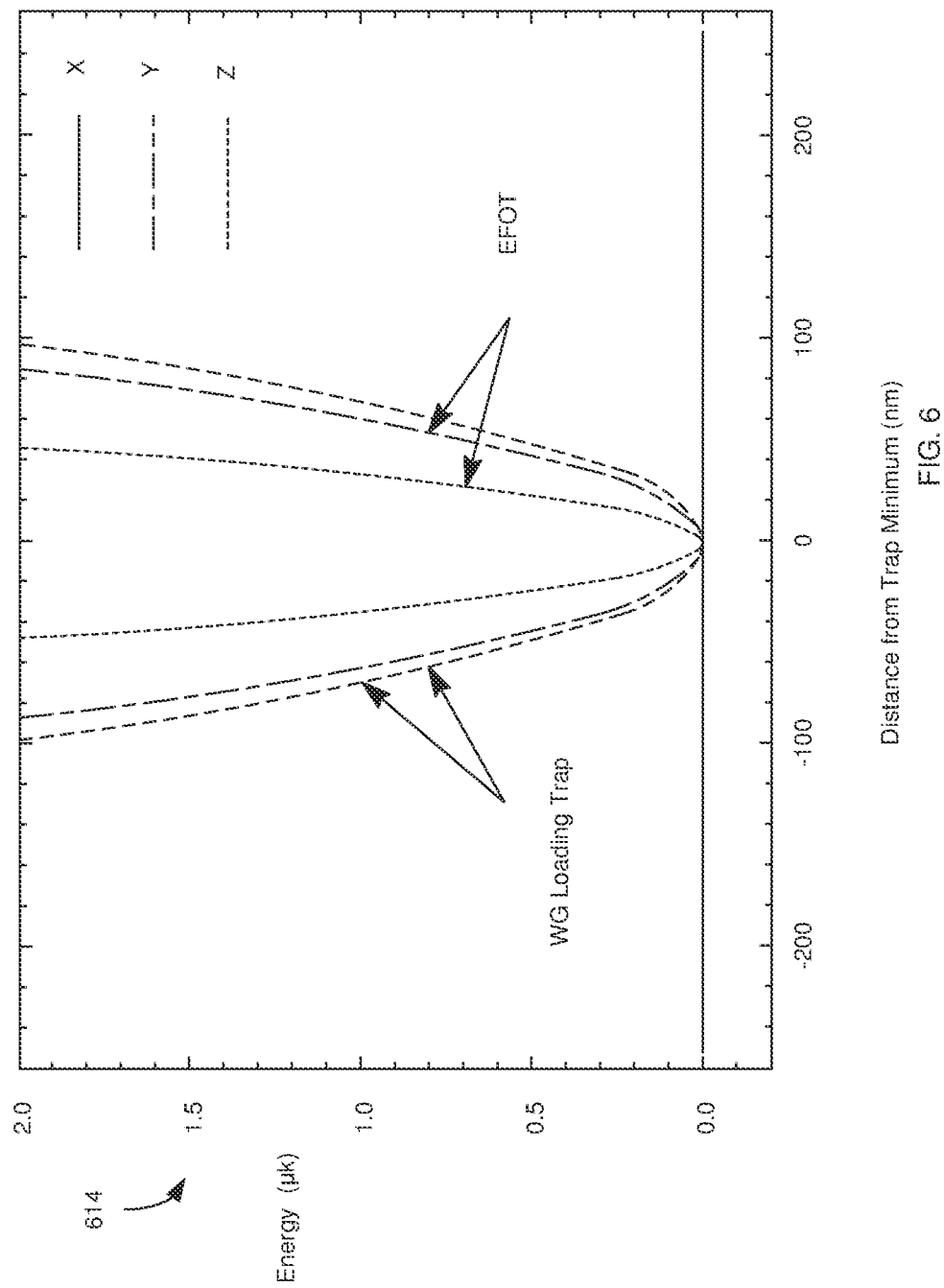
FIG. 6 illustrates a graph of an embodiment of simulation details for the integrated atom chip, including mode matched trap energy for the waveguide loading trap and an evanescent field optical trap as they vary with distance from the trap center.

After a BEG is produced, the final atom chip magnetic potential will be positioned near the SiN waveguide surface by rotating and increasing the magnitude of the external magnetic bias field. This shifts the magnetic trap closer to the waveguide, while increasing the transverse trap frequency to $\omega_x \cong 30\text{-}50$ kHz with reasonable system parameters. The trap can be positioned arbitrarily close to the waveguide, as opposed to a MOT 330 by itself that is limited to $\gtrsim 50$ μm away. The trap volume of the EFOT is dictated primarily by the evanescent decay length of the guided optical mode $L_D = \lambda/(4\pi\sqrt{n^2-1})$, where $\lambda$ is the wavelength and n is the effective index of the guide. Initial modeling of the proposed waveguide shows an EFOT located $\approx 100\text{-}200$ nm from the waveguide surface, with $\omega_x \cong 50\text{-}80$ kHz and depth $\gtrsim 100$ μK. FIG. 6 shows a graph of the simulation details, including $\beta$ values.

A comparison of the atom chip's EFOT loading approach can be made to a prior practice of loading just from a general MOT by itself. The magnetic gradient of a MOT 330 shown in the top graph is typically tens of G/cm, $\approx 10^5 \times$ weaker than the final magnetic trap shown in the bottom graph. Additionally, the temperature of a BEC is $\approx 100 \times$ less than is typically achieved in sub-Doppler cooling. Combining these two factors, the atom chip loading technique enables a dramatic, for example, $\approx 10^6 \times$ improvement in mode matching to the EFOT.

Trap mode matching can be further optimized by loosening the EFOT by maximizing the quantity $\alpha_L = L_{D,red}/L_{D,blue} - 1$, which quantifies the relative evanescent decay lengths of red and blue trap light. This will be accomplished by reducing the SiN rib height and selecting ideal wavelength red and blue light sources.

Magnetic-to-EFOT Hand-Off:

Once the evanescent field optical trap and magnetic trap are mode matched and spatially overlapped, then the atoms will be transferred from the final magnetic trap to the evanescent field optical trap in one of the following ways: (i) adiabatic, simultaneous ramp down (up) of the magnetic (optical) potential, (ii) two-photon optical Raman transition from the atoms magnetically trapped $|F=1, m_F=-1\rangle$ to the untrapped $|F=1, m_F=0\rangle$ state, (iii) two-photon, optical and microwave state-transfer, and iv) any combination of these three. Trap mode matching inherently yields roughly $10^6 \times$ improvement in loading efficiency.

In order to maintain the matter wave properties of the BEC, the handoff process must be coherent and induce minimal heating. The method (i) requires only the traps themselves and optimized ramp schemes, but is expected to result in less optimal mode matching during the handoff process. Both the methods (ii) and (iii) require additional laser or microwave sources, but directly load the atoms into (out of) the optical (magnetic) potential by coherently transferring atoms into a Zeeman sublevel with minimal (quadratic) sensitivity to the atom chip magnetic field. While method (iii) is expected to provide minimal perturbation and the best trap handoff efficiency, methods (i) and (ii) offer alternatives to mitigate risk.

The trap quality of an EFOT can be far superior to magnetic planar surface traps due to the low surface roughness and scattering achievable in optical waveguides, with losses $\lesssim 1$ dB/cm at near infrared wavelengths.

Matter Wave Interferometry

Figure 4:
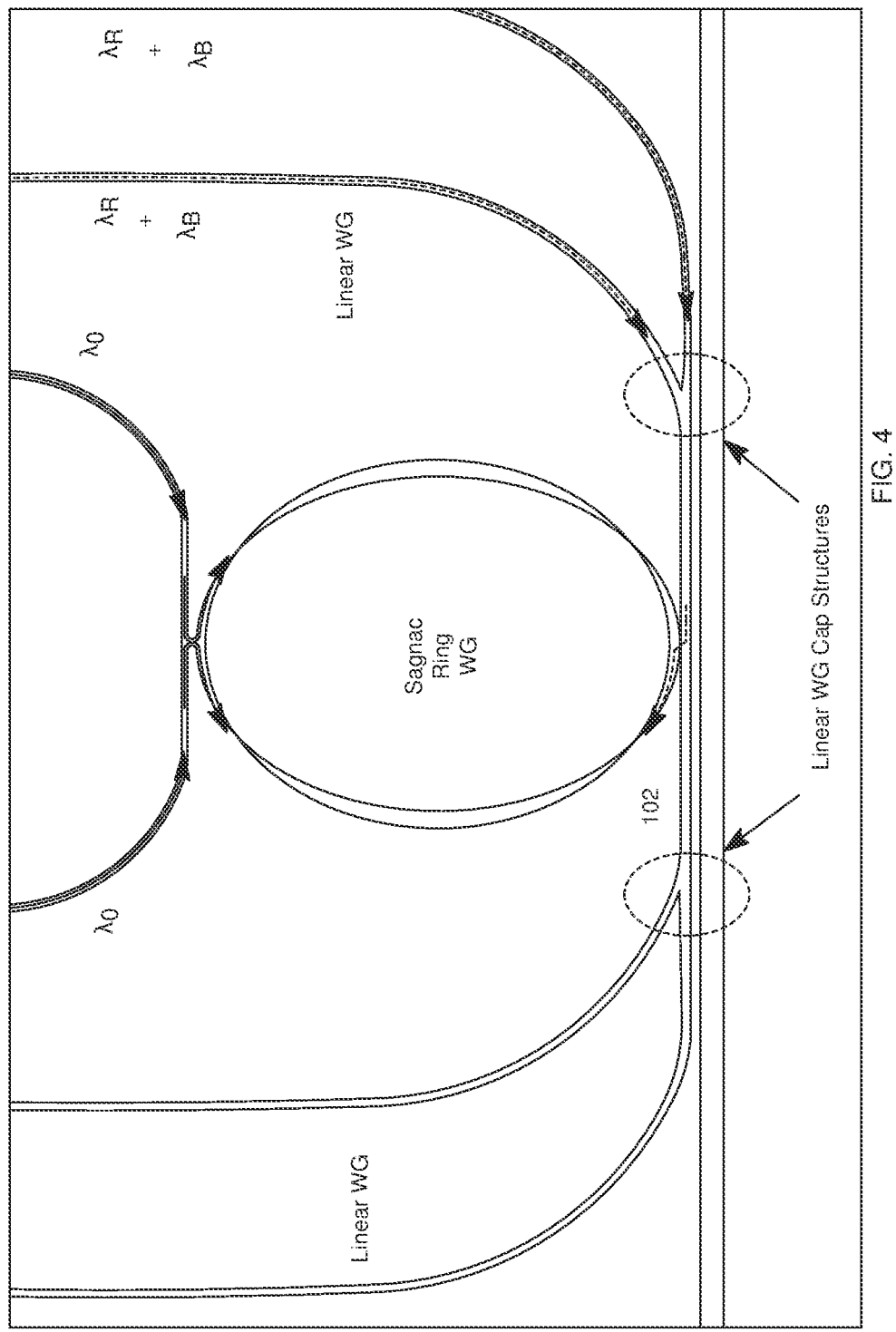
FIG. 4 illustrates a diagram of an embodiment of a set of waveguide structures imprinted onto the top layer to accomplish both linear and rotational inertial measurements.

Once in the EFOT, the BEC can be utilized for matter wave inertial sensing measurements. An embodiment for waveguide patterns to accomplish both linear and rotational inertial measurements is shown in FIG. 4. The evanescent field optical trap simultaneously provides robust confinement of atoms and strong coupling between atoms and an optical field. The optical waveguide provides a strong optical link to trapped atoms that will be utilized during interferometry sequences and provides a beneficial tool for future research in atomtronics and quantum information science (QS).

The specific design of the planar waveguide geometry can be tailored to multiple sensing and metrology modalities. In this way, the waveguide geometry can be designed to suit multiple applications, e.g., a linear pattern waveguide to realize an accelerometer, a ring pattern waveguide to realize a gyroscope. Additionally, strong atom-light coupling has direct application to the developing field and associated applications of quantum information processing, e.g., quantum repeaters and entangled quantum sensors.

Integrated Chip Fabrication

Referring back to FIG. 1A, the integrated atom chip 100 can be fabricated on a silicon substrate with a thermal oxide layer; and thus, is conducive to wafer level batch fabrication process. The high-reflectivity coated surface can be deposited according to standard electron beam deposition techniques. The metal traces are deposited with patterned photoresist and electron beam deposition or electroplating techniques. The optical waveguide can be a $Si_3N_4$ on $SiO_2$ on Si design, patterned and deposited according to standard practice using photo-resist, chemical vapor deposition, and electron beam lithography techniques.

The integrated atom chip consists of two main chips. The base chip consists of gold or silver wires selectively patterned on an AlN or Si wafer. The wafer material can be chosen for its large thermal conductivity. The waveguide chip can be silicon wafer that is wet oxidized to give a >1 μm thick cladding layer of $SiO_2$. Next, SiN can be deposited for the waveguide core layer. The core can be patterned by direct-write e-beam lithography and reactive ion etching. Next, wires and patches of a high reflectivity metal or quarter-wave stack optical coating can be sequentially deposited by e-beam evaporation and patterned by lift-off. To complete the assembly the waveguide chip can be bonded onto the base chip and subsequently fiber coupled.

Vacuum System and Integrated Chip

Functionality of the integrated atom chip 100 can be characterized in a benchtop ultrahigh vacuum (UHV, $\sim 1e^{-10}$ torr) system with two main chambers, one dedicated "science chamber" containing the chip, and a second chamber for a two-dimensional MOT (2D-MOT) and solid alkali metal dispensers. The vacuum system can use a proven miniaturization path in a silicon and glass UHV chamber fabrication technology that is compatible with the planar integrated chip materials.

Waveguide Chip Design

The waveguide chip controls EFOT quality and atom loading. Low-loss ($\lesssim$dB/cm), high-quality optical waveguides can be fabricated as a silicon nitride rib on a silicon wafer with an intermediate layer of μm-thick thermally grown silicon dioxide ($SiO_2$) for proper waveguide index profile and minimized coupling to the underlying silicon (see FIG. 5). Both the optical power loss and corrugation of the potential will be minimized by maximizing the fraction of the light propagating outside of the waveguide material. This is accomplished by reducing the height of the rib waveguide, while maintaining the single mode TE- or TM-like lowest order guided mode. Standing-wave patterns caused by reflections at the waveguide facets and scattered light contribute to roughness of the EFOT. These effects can be sufficiently mitigated with anti-reflection coated chip facets and coupling fibers, as well as by implementing reduced coherence length trapping light sources (bandwidths ≳2 nm.) Finally, full three-dimensional atom confinement is considered in both linear and ring pattern waveguides.

FIGS. 3-5 illustrate an embodiment of the multilayer chip design and functional diagrams including the waveguide scheme for trapping and matter wave interferometry. The waveguide structures provide end caps to linear potential.

As discussed, FIG. 3 illustrates a diagram of an embodiment of an example set of integrated magnetic trapping structures progressing left to right from a looser magnetic coupling to a tighter magnetic coupling on progressively cooler atoms being trapped. Starting from the left, the Cu wires for the m-MOT 330 can be used as an initial magnetic trap on the support structure. In the middle is a Z-shaped wire trap on the base layer for BEC formation. On the right is an EFOT mode-matching wire on the top layer as well as the imprinted waveguides in the top layer.

Chip functions range from initial laser cooling and magnetic trapping, to the preparation of an ultracold ensemble of, for example, 87 Rb atoms, and finally matter wave trapping in a high-quality optical waveguide potential. Electrical and optical connection to on-chip current and light carrying structures is accomplished with wire bonds and surface grating or mode-matched, end-fire fiber coupling.

FIG. 5 illustrates a diagram of an embodiment of a half dome shaped EFOT 550 potential evenly forming above the SiN waveguide, which is formed on the base $SiO_2$. The EFOT potential sits above the SiN waveguide. The half dome shaped EFOT 550 does not have a flat bottom but mirrors the shape of the guided mode within the SiN waveguide. FIG. 5 shows an example finite element analysis of blue and red $TE_0$ modes in a 300 nm×800 nm SiN rib waveguide on 1 μm $SiO_2$ layer; with the EFOT potential a minimum of equal to or greater than 100 nm above the surface of the SiN waveguide. In this particular example, the evanescent field optical trap is formed by a balanced optical dipole forces of both blue- and red-detuned light guided in a waveguide.

FIG. 4 illustrates an embodiment of a set of waveguide patterns imprinted onto the top layer to accomplish both linear and rotational inertial measurements. Both waveguide patterns 102 linear and ring potentials contain the required components for full interferometer sequences, namely splitting, propagation, and recombination. Whether in the ring or linear patterned waveguide, the matter wave can be split in a Bragg pulse scheme using counter-propagating, near resonant light in an additional waveguide (above the ring in FIG. 4) that evanescently couples into the adjacent waveguides. Both the linear and ring patterns for the waveguide create periodic potentials, meaning the atoms will return to their original position after a fixed time. Thus, interferometer cycles consist of a two Bragg pulses separated by the trap period, followed by detection.

The waveguides can couple optical modes between the ring and adjacent linear waveguides. The waveguide coupling factors in considerations of the shape and position of the EFOT, as well as optical phase coherence of the Bragg splitting light.

FIG. 4 can be thought of as a counter clockwise view of FIG. 1B with a lot of flow direction arrows and circles around the 'Y' shaped intersections of the imprinted optical waveguide. The waveguide structures provide end caps to linear potential. The waveguide geometry with linear waveguide cap structures in the shape of roughly a 'Y' shape.

FIG. 4 shows wavelengths (lambda) being separated into different patterns of waveguides imprinted on the chip in order to be able to inject and extract light of different wavelengths. For example, resonant light shown in Lambda black ($\lambda_O$) can be routed in a waveguide, and Lambda Blue ($\lambda_B$) and Lambda Red ($\lambda_R$) light wavelengths can be routed in another pattern of the waveguide.

The integrated atom chip with its magnetic and optical component architecture leverages highly controllable magnetic traps generated on the atom chip in order to load atoms into the evanescent field optical trap of a nanofabricated optical waveguide with a geometry designed for trapped atom inertial sensing. Thus, the chip has at least one or more controllable magnetic traps that are generated on the atom chip in order to load atoms into the evanescent field optical trap of a nanofabricated optical waveguide that is also imprinted on a layer of the atom chip. In addition the pattern of the nanofabricated optical waveguide is designed with a geometry for trapped atom inertial sensing. (e.g. see FIG. 4)

Application of the Integrated Atom Chip

The integrated atom chip is capable of preparing and loading ultracold atoms into a high-quality optical waveguide with geometries of interest. The integrated atom chip will enable future integration of small size devices for applications ranging from well-known inertial sensing schemes to the emerging field of quantum information science and atomtronics.

Prior techniques have yet to demonstrate atom trapping in an EFOT and are limited primarily by a small trap volume (approximately a 100 $nm^2$ cross section). However, the current design of initially trapping and cooling atoms in the deep, tight magnetic potential formed by the integrated atom chip, could have six orders of magnitude improvement in trap-loading efficiency over previous approaches, enabling advancement of atomic sensors directly coupled with photonic integrated circuits (PIC).

The integrated atom chip with its magnetic and optical component architecture addresses major trap limitations of state-of-the-art atom inertial sensors. EFOTs are tight (≳$10^3$× gravity), providing robustness against changes in orientation and supporting high dynamic range operation. Moreover, the integrated atom chip with its planar construction and waveguide architecture allows for scalable sensor size and increased sensitivity while providing a path to chip-scale precision sensors. Beyond inertial sensing applications, the integrated chip system inherently provides strong atom-light coupling, which has immediate application in the growing atomtronics and quantum information science fields.

The integrated atom chip allows a small-scale, robust platform for inertial sensing with coherent atomic matter waves. This integrated atom chip develops a technology and methodology that is widely applicable to DoD and academic research interests. Applications include electromagnetic field sensing, inertial sensing (e.g., accelerometers, and gyroscopes), as well as precision measurements of the gravitational constant, equivalence principle, and geoid. A gravity sensor measures the acceleration effect of Earth's gravity on the device enclosing the sensor. An inertial sensor makes measurements based on inertia. An electromagnetic field makes measurements based on electric or magnetic fields. A geoid sensor makes measurements based on the shape of the Earth, such as GPS.

The integrated atom chip enables ultra-precise neutral atom sensing and time-keeping on small platforms, as well as a robust interface between the quantum state of ultracold atoms and photons.

Example Applications include:

Pointing, navigation and timing (PNT) measurement with sufficient precision for long-time GPS-free navigation of underwater vehicles or similar.

Precision optical clock time-keeping and optical time synchronization.

Precision metrology, including gravimetry, magnetometry, and electrometry such as accelerometers and gyroscopes.

As discussed, the integrated atom chip can be fabricated using wafer-scale lithography and silicon photonics processes. The integrated atom chip enables optical waveguide trapped BEC and subsequent matter wave interferometry measurements.

The integrated atom chip that integrates two or more magnetic traps and an optical waveguide imprinted onto the integrated atom chip for measuring atoms allows precision PNT and metrology in a system that is insensitive to platform motion (as the optical trap potentials are 1000× stronger than gravity) meaning this solution can be used in UAVs and UUVs.

FIG. 6 illustrates a graph of an embodiment of simulation details for the integrated atom chip, including mode matched trap energy for the waveguide loading trap and an evanescent field optical trap as they vary with distance from the trap center.

FIG. 6 illustrates a graph of an initial simulation model results for the atom chip magnetic and EFOT trap curvatures for EFOT mode matching. The atom chip's optimized traps achieve efficient atom loading when the trap volumes of the initial and final traps are well mode matched and spatially overlapped. FIG. 6 is a magnified view of a portion of the bottom transfer to EFOT graph shown on FIG. 2C, which shows the scaling in millimeters and FIG. 6 shows the scaling in nanometers. FIG. 6 illustrates a graph of an embodiment of simulation details for the integrated atom chip, including trap energy values 614 for the waveguide loading and an evanescent field optical trap, with a distance from the trap.

The FIG. 6 graph shows initial model results for example chip magnetic (dashed) and EFOT (solid) trap curvatures. The graph shows the waveguide loading and EFOT trap energies vs position. With these structures a mode matching value of β=0.62 is achieved. Parameters: 0.25 A in loading wire, 2 A in base chip Z-wire, and 40 G bias field, 4 mW 760 nm light, 20 mW 1064 nm light. For reference, a MOT achieves only β5e-7.

The integrated atom chip provides evanescent field trapping in nanofabricated waveguides. Current approaches are limited by the small (≈100 nm) spatial separation between the EFOT and waveguide surface. The integrated atom chip has multiple unique aspects that extend device capabilities beyond the state of the art. Most notably, the tight magnetic trap formed by an atom chip enables six orders of magnitude improvement in EFOT loading efficiency vs. current approaches that attempt direct loading from a magneto-optical trap (MOT). Also, the integrated atom chip's magnetic potential is positioned near the SiN waveguide surface by rotating and increasing the magnitude of the external magnetic bias field. This shifts the magnetic trap closer to the waveguide, while increasing the transverse trap frequency.

Also, the atom chip's design uses an optimized trap geometry to achieve efficient atom loading when the trap volumes of the initial and final traps are well mode matched and spatially overlapped. Mode matching for EFOT loading occurs via magnetic trap loading of the evanescent field optical trap.

The atom chip's architecture uses planar surface trap structures capable of preparing and loading ultracold atoms into high-quality atom waveguides generated on the same chip. Here, the high-quality waveguide is an evanescent field optical trap formed by the balanced optical dipole forces of both blue- and red-detuned light guided in a silicon nitride (SiN) rib waveguide. After establishing and optimizing protocols for loading atoms into the waveguide trap, the integrated atom chip implements a waveguide architecture to perform guided matter wave interferometry. (e.g. see FIG. 4).

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An integrated atom chip for measuring atoms, comprising:
   one or more magnetic traps integrated with an optical waveguide that is imprinted onto the integrated atom chip in order to facilitate loading of the atoms into an evanescent field optical trap of the optical waveguide in order to measure the atoms; and
   two or more stages of cooling configured to progressively cool the atoms from an initial temperature down to a final temperature of the atoms when loaded into the evanescent field optical trap of the optical waveguide.

2. The integrated atom chip of claim 1, where the two or more stages of cooling are i) a first stage of cooling configured to use a magneto-optical trap to cool the atoms; ii) a second stage of cooling configured to use Radio Frequency based cooling on atoms trapped within a magnetic field generated by a pattern of electrical traces formed on one or more layers of the integrated atom chip.

3. The integrated atom chip of claim 1, further comprising:
   a pattern of metal traces on a first layer of the integrated atom chip configured to generate a first controllable magnetic trap in order to load atoms into the evanescent field optical trap of the optical waveguide imprinted on a second layer of the integrated atom chip, and where a pattern of the optical waveguide is designed with a geometry for trapped atom inertial sensing.

4. The integrated atom chip of claim 1, where the integrated atom chip is constructed to integrate optical and magnetic components on multiple layers of the integrated atom chip including
   a top layer that contains the optical waveguide in a co-planar structure to a first magnetic trap used for magnetic loading of the atoms into the evanescent field optical trap of the optical waveguide, where the top layer also has a reflective coated optical surface along with the optical waveguide, and the top layer also has a mode-matching wire to match modes between the evanescent field optical trap and the first magnetic trap.

5. The integrated atom chip of claim 4, further comprising:
   a base layer with patterned electric current carrying metal traces used to create a magnetic trap for the atoms, where the optical waveguide, the first magnetic trap, and the patterned electric current carrying metal traces all integrate to trap, cool, and load the atoms into the evanescent field optical trap of the optical waveguide.

6. The integrated atom chip of claim 1 is fabricated on a semiconductor substrate with a thermal oxide layer.

7. The integrated atom chip of claim 1, further comprising:
   a magneto-optical trap configured to initially capture and cool the atoms, where the atoms are then optically pumped to a magnetically trappable state and captured in a magnetic potential formed by electrical current flowing through lithographically patterned metal traces on a base layer of the integrated atom chip, and where the magnetic potential formed by the electrical current flowing through the lithographically patterned metal traces is a tighter magnetic confinement on progressively cooler atoms being trapped compared to the atoms initially captured in the magneto-optical trap.

8. The integrated atom chip of claim 1, further comprising:
   a waveguide loading component configured to load the atoms into the evanescent field optical trap, by mode matching and spatially overlapping a final magnetic trap and the evanescent field optical trap.

9. The integrated atom chip of claim 8, wherein the atoms will be transferred from the final magnetic trap by the waveguide loading component to the evanescent field optical trap in one of the following ways: (i) adiabatic, simultaneous ramp down or ramp up of the magnetic potential, (ii) two-photon optical Raman transition from the atoms magnetically trapped to an untrapped state, (iii) two-photon, optical and microwave state-transfer, and iv) any combination of these three.

10. A sensor, comprising:
    an integrated atom chip for measuring atoms that includes two or more magnetic traps integrated with an optical waveguide that is imprinted onto the integrated atom chip in order to facilitate loading of the atoms into an evanescent field optical trap of the optical waveguide in order to measure the atoms, where a first controllable magnetic trap is generated on the integrated atom chip in order to load atoms into the evanescent field optical trap of the optical waveguide imprinted on a layer of the integrated atom chip, and where a pattern of the optical waveguide is designed with a geometry for trapped atom measuring.

11. The sensor of claim 10, wherein the sensor is selected from a group consisting of i) an inertial sensor, ii) a gravitational constant sensor, iii) a geoid sensor, iv) an electromagnetic field sensor and v) any combination of these sensors.

12. A method for an integrated atom chip used for measuring atoms, comprising:
    fabricating one or more magnetic traps integrated with an optical waveguide that is imprinted onto the integrated atom chip in order to facilitate loading of the atoms into an evanescent field optical trap of the optical waveguide in order to measure the atoms; and
    fabricating two or more stages of cooling that are used to progressively cool the atoms from an initial temperature down to a final temperature of the atoms when loaded into the evanescent field optical trap of the optical waveguide.

13. The method for the integrated atom chip of claim 12, where the two or more stages of cooling are i) a first stage of cooling configured to use a magneto-optical trap to cool the atoms; ii) a second stage of cooling configured to use Radio Frequency based cooling on atoms trapped within a magnetic field generated by a pattern of electrical traces formed on one or more layers of the integrated atom chip.

14. The method for the integrated atom chip of claim 12, further comprising:
    fabricating a pattern of metal traces on a first layer of the integrated atom chip to generate a first controllable magnetic trap in order to load atoms into the evanescent field optical trap of the optical waveguide imprinted on a second layer of the integrated atom chip, and where a pattern of the optical waveguide is designed with a geometry for trapped atom inertial sensing.

15. The method for the integrated atom chip of claim 12, further comprising:
    fabricating the integrated atom chip to integrate optical and magnetic components on multiple layers of the integrated atom chip including
    a top layer that contains the optical waveguide in a co-planar structure to a first magnetic trap used for magnetic loading of the atoms into the evanescent field optical trap of the optical waveguide, where the top layer also has a reflective coated optical surface along with the optical waveguide, and the top layer also has a mode-matching wire to match modes between the evanescent field optical trap and the first magnetic trap.

16. The method for the integrated atom chip of claim 15, further comprising:
    fabricating a base layer with patterned electric current carrying metal traces used to create a magnetic trap for the atoms, where the optical waveguide, the first magnetic trap and the patterned electric current carrying metal traces all integrate to trap, cool, and load the atoms into the evanescent field optical trap of the optical waveguide.

17. The method for the integrated atom chip of claim 16 using a wafer fabrication process to fabricate the integrated atom chip on a semiconductor substrate with a thermal oxide layer.

18. The method for the integrated atom chip of claim 12, further comprising:
    fabricating a magneto-optical trap to initially capture and cool the atoms, where the atoms are then optically pumped to a magnetically trappable state and captured in a magnetic potential formed by electrical current flowing through lithographically patterned metal traces on a base layer of the integrated atom chip, and where the magnetic potential formed by the electrical current flowing through the lithographically patterned metal traces is a tighter magnetic confinement on progressively cooler atoms being trapped compared to the atoms initially captured in the magneto-optical trap.

19. The method for the integrated atom chip of claim 12, further comprising:
    fabricating a waveguide loading component configured to load the atoms into the evanescent field optical trap, by mode matching and spatially overlapping a final magnetic trap and the evanescent field optical trap.

20. The method for the integrated atom chip of claim 18, wherein once the evanescent field optical trap and a final magnetic trap are mode matched and spatially overlapped, then the atoms will be transferred from the magnetic trap to the evanescent field optical trap in one of the following ways: (i) adiabatic, simultaneous ramp down or ramp up of a magnetic potential, (ii) two-photon optical Raman transition from the atoms magnetically trapped to an untrapped state, (iii) two-photon, optical and microwave state-transfer, and iv) any combination of these three.

* * * * *